(12) United States Patent
Muragishi

(10) Patent No.: US 10,479,695 B2
(45) Date of Patent: *Nov. 19, 2019

(54) POROUS TITANATE COMPOUND PARTICLES AND METHOD FOR PRODUCING SAME

(71) Applicant: OTSUKA CHEMICAL CO., LTD., Osaka, Osaka (JP)

(72) Inventor: Haruna Muragishi, Tokushima (JP)

(73) Assignee: OTSUKA CHEMICAL CO., LTD., Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/754,636

(22) PCT Filed: Sep. 5, 2016

(86) PCT No.: PCT/JP2016/075966
§ 371 (c)(1),
(2) Date: Feb. 23, 2018

(87) PCT Pub. No.: WO2017/051690
PCT Pub. Date: Mar. 30, 2017

(65) Prior Publication Data
US 2018/0237310 A1 Aug. 23, 2018

(30) Foreign Application Priority Data

Sep. 24, 2015 (JP) .................................. 2015-186940

(51) Int. Cl.
*C01G 23/00* (2006.01)
*C08J 5/04* (2006.01)
*C08K 3/22* (2006.01)

(52) U.S. Cl.
CPC ............ *C01G 23/005* (2013.01); *C08J 5/044* (2013.01); *C08K 3/22* (2013.01); *C01P 2004/03* (2013.01);
(Continued)

(58) Field of Classification Search
CPC .......... C01G 23/005; C08J 5/044; C08K 3/22; C09K 3/14; F16D 69/02
See application file for complete search history.

(56) References Cited

U.S. PATENT DOCUMENTS

2003/0147804 A1   8/2003   Ogawa et al.
2004/0253173 A1   12/2004  Ogawa et al.
(Continued)

FOREIGN PATENT DOCUMENTS

CN    1576637 A     2/2005
CN    101801851 A   8/2010
(Continued)

OTHER PUBLICATIONS

International Search Report dated Oct. 18, 2016, issued in counterpart application No. PCT/JP2016/075966. (2 pages).
(Continued)

*Primary Examiner* — Melvin C. Mayes
*Assistant Examiner* — Michael Forrest
(74) *Attorney, Agent, or Firm* — Westerman, Hattori, Daniels & Adrian, LLP

(57) ABSTRACT

Provided are porous titanate compound particles capable of giving excellent fade resistance and moisture-proof properties when used in a friction material, a friction material composition, a friction material, a friction member, and a method for producing the porous titanate compound particles. Porous titanate compound particles have a cumulative pore volume of 5% or more within a pore diameter range of 0.01 to 1.0 µm, are each formed of titanate compound crystal
(Continued)

grains bonded together, and each includes a treated layer formed on a surface thereof and made of a hydrophobic surface treatment agent.

8 Claims, 1 Drawing Sheet

(52) U.S. Cl.
CPC ...... *C01P 2004/62* (2013.01); *C01P 2006/90* (2013.01); *C08J 2300/24* (2013.01); *C08K 2003/2241* (2013.01)

(56) References Cited

U.S. PATENT DOCUMENTS

| | | | |
|---|---|---|---|
| 2005/0014862 A1 | 1/2005 | Kusaka et al. | |
| 2008/0249222 A1 | 10/2008 | Itoi | |
| 2010/0112350 A1* | 5/2010 | Tanimizu | C01G 23/005 428/401 |
| 2010/0323876 A1 | 12/2010 | Higashi et al. | |
| 2011/0052906 A1* | 3/2011 | Itoi | C01G 23/003 428/332 |
| 2011/0158898 A1 | 6/2011 | Itoi | |
| 2016/0221882 A1 | 8/2016 | Muroya et al. | |

FOREIGN PATENT DOCUMENTS

| | | | | |
|---|---|---|---|---|
| CN | 102958844 A | | 3/2013 | |
| JP | 3-179079 A | | 8/1991 | |
| JP | 9-291271 A | | 11/1997 | |
| JP | 10-139894 A | | 5/1998 | |
| JP | 2009-114050 A | | 5/2009 | |
| JP | 2009126732 A | * | 6/2009 | ............ C01B 33/38 |
| JP | 2012-12261 A | | 1/2012 | |
| JP | 2015-59143 A | | 3/2015 | |
| WO | 02/010069 A1 | | 2/2002 | |
| WO | 03/037797 A1 | | 5/2003 | |
| WO | 2008/123046 A1 | | 10/2008 | |
| WO | WO 2012002122 A1 | * | 1/2012 | ........... C01G 23/005 |

OTHER PUBLICATIONS

Written Opinion dated Oct. 18, 2016, issued in counterpart application No. PCT/JP2016/075966. (3 pages).
Notification of Transmittal of Translation of the International Preliminary Report on Patentability (Form PCT/IB/338) issued in counterpart International Application No. PCT/JP2016/075966 dated Apr. 5, 2018, with Forms PCT/IB/373 and PCT/ISA/237. (6 pages).
Office Action dated May 8, 2019, issued in counterpart CN Application No. 201680055507.4, with English translation. (15 pages).

* cited by examiner

[FIG. 1]
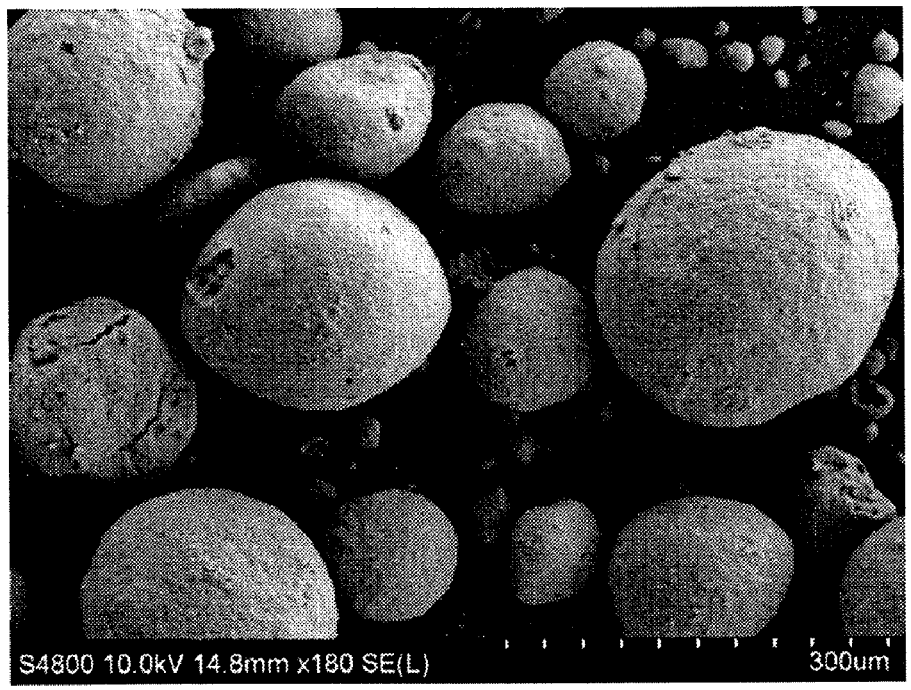
[FIG. 2]
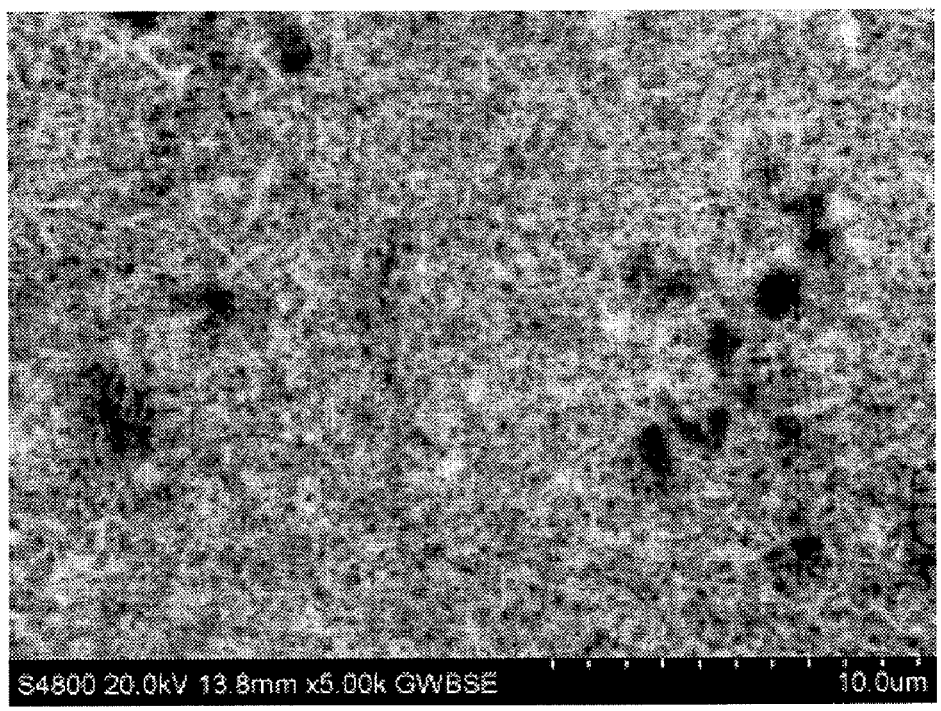

POROUS TITANATE COMPOUND PARTICLES AND METHOD FOR PRODUCING SAME

TECHNICAL FIELD

The present invention relates to porous titanate compound particles and a method for producing the same.

BACKGROUND ART

Friction materials for use in brake systems for various types of vehicles, industrial machines, and so on are required to have high and stable coefficients of friction and have excellent wear resistance. To meet these characteristics, use was made, as the friction materials, of resin compositions in which potassium titanate fibers, an inorganic filler, an organic filler, and so on are compounded with a thermosetting resin (binder), such as a phenolic resin, for binding the above additives.

Potassium titanate fibers are not carcinogenic, unlike asbestos, and do not damage rotors, unlike metal fibers. However, many types of potassium titanate fibers have an average fiber diameter of 0.1 to 0.5 μm and an average fiber length of 10 to 20 μm, which are not included within a range of fibers recommended by the World Health Organization (WHO) (range of fibers except for WHO fibers as inhalable fibers, i.e., fibrous compounds having an average minor diameter of 3 μm or less, an average fiber length of 5 μm or more, and an aspect ratio of 3 or more). Furthermore, potassium titanate fibers have inadequate wear resistance within a high temperature range.

To cope with this, flaky magnesium potassium titanate, flaky lithium potassium titanate, and amoeboid potassium titanate are proposed in Patent Literatures 1, 2, and 3, respectively.

In addition, the friction materials are required to have excellent fade resistance. A fade phenomenon of a friction material is a phenomenon due to the fact that organic components in the friction material are gasified with increasing temperature of the friction material, resulting in the formation of a gas layer at the frictional interface with a disc. The fade resistance of the friction material can be improved by preventing the formation of the gas layer at the frictional interface. To this end, it is useful to increase the porosity of the friction material to allow easy escape of the gas from the frictional interface. It is conceivable as a method for increasing the porosity of the friction material to adjust and set the forming pressure at a smaller value in the step of binding and forming a source material mixture. However, when the forming pressure is lowered, the friction material decreases its strength and wear resistance and, therefore, cannot achieve good frictional properties.

To cope with this, in Patent Literature 4, hollow powder of an alkaline titanate is proposed which is formed of hollow bodies in each of which alkaline titanate particles having a rodlike, prismoidal, columnar, strip-shaped, granular and/or platy form are bound together.

Meanwhile, friction materials for use in disc brakes, brake linings, and so on of vehicles generally have a high porosity of 10 to 30% for the purposes of increasing the fade resistance and increasing the effectiveness at high speed. Therefore, for example, when a vehicle is parked for a long time or washed, such a friction material is likely to absorb moisture or water. It is known that when water (moisture) adheres to the surface of the friction material or is taken into the friction material, so that the friction material absorbs moisture or water, the coefficient of friction of the friction material becomes extremely high as compared with when the friction material is dry, resulting in the occurrence of brake noise (squeal) during braking.

To cope with this, Patent Literature 5 proposes a friction material containing aramid fibers surface-treated with a silane coupling agent.

CITATION LIST

Patent Literature

Patent Literature 1: WO 2002/010069
Patent Literature 2: WO 2003/037797
Patent Literature 3: WO 2008/123046
Patent Literature 4: JP-A-2009-114050
Patent Literature 5: JP-A-H09-291271

SUMMARY OF INVENTION

Technical Problem

However, titanate compounds used in Patent Literatures 1 to 4 may not provide sufficient fade resistance and may contain a trace of WHO fibers. Furthermore, because titanate compounds have high moisture absorbency, there arises a problem that their porous particles have higher moisture absorbency.

An object of the present invention is to provide porous titanate compound particles capable of giving excellent fade resistance and moisture-proof properties when used in a friction material, a friction material composition, a friction material, a friction member, and a method for producing the porous titanate compound particles.

Solution to Problem

The present invention provides the following porous titanate compound particles, the following friction material composition, the following friction material, the following friction member, and the following method for producing the porous titanate compound particles.

Aspect 1: Porous titanate compound particles having a cumulative pore volume of 5% or more within a pore diameter range of 0.01 to 1.0 μm, each formed of titanate compound crystal grains bonded together, and each including a treated layer formed on a surface thereof and made of a hydrophobic surface treatment agent.

Aspect 2: The porous titanate compound particles according to aspect 1, wherein the hydrophobic surface treatment agent is alkoxysilane represented by the following general formula (1):

$$R^1{}_n Si(OR^2)_{4-n} \qquad (1)$$

where in the general formula (1) n represents an arbitrary integer selected from 1 to 3; $R^1$ represents an alkyl group, an alkenyl group or an aryl group, each group having a substituent or being free of substituent; as for $R^1$ comprising a plurality of $R^1$s, the plurality of $R^1$s are identical to or different from each other; $R^2$ is an alkyl group having a substituent or free of substituent; and as for $R^2$ comprising a plurality of $R^2$s, the plurality of $R^2$s are identical to or different from each other.

Aspect 3: The porous titanate compound particles according to aspect 1 or 2, having an average particle diameter of 5 to 500 μm.

Aspect 4: The porous titanate compound particles according to any one of aspects 1 to 3, wherein the titanate compound is expressed by a composition formula $A_2Ti_nO_{(2n+1)}$ where A represents at least one selected from alkali metals and n=2 to 8.

Aspect 5: A friction material composition containing: the porous titanate compound particles according to any one of aspects 1 to 4; and a thermosetting resin.

Aspect 6: A friction material obtained by forming the friction material composition according to aspect 5.

Aspect 7: A friction member including a substrate and the friction material according to aspect 6, the friction material being provided on the substrate.

Aspect 8: A method for producing the porous titanate compound particles according to any one of aspects 1 to 4, the method including the steps of: mechanically grinding a titanium source and an alkali metal salt to prepare a ground mixture; dry-granulating the ground mixture to prepare a granulated material; firing the granulated material to produce a fired product; and surface-treating the fired product with a hydrophobic surface treatment agent.

Advantageous Effects of Invention

The porous titanate compound particles according to the present invention can give excellent fade resistance and moisture-proof properties when used in a friction material.

BRIEF DESCRIPTION OF DRAWINGS

FIG. 1 is a scanning electron micrograph showing complete images of porous titanate compound particles in Example 1.

FIG. 2 is a scanning electron micrograph showing an internal structure of a porous titanate compound particle in Example 1.

DESCRIPTION OF EMBODIMENTS

Hereinafter, a description will be given of a preferred embodiment. However, the following embodiment is simply illustrative and the present invention is not limited to the following embodiment.

<Porous Titanate Compound Particles>

Porous titanate compound particles according to the present invention have a cumulative pore volume of 5% or more within a pore diameter range of 0.01 to 1.0 μm, are each formed of titanate compound crystal grains bonded together, and each includes a treated layer formed on a surface thereof and made of a hydrophobic surface treatment agent. Specifically, the porous titanate compound particles according to the present invention are obtained by subjecting porous titanate compound particles having a cumulative pore volume of 5% or more within a pore diameter range of 0.01 to 1.0 μm and each formed of titanate compound crystal grains bonded together by firing and/or fusion bonding or the like to a surface treatment with a hydrophobic surface treatment agent.

In the present invention, the above cumulative pore volume is preferably 10% or more and more preferably 15% or more. The upper limit of the above cumulative pore volume is preferably 40% and more preferably 30%. If the above cumulative pore volume is too small, the porous titanate compound particles may not be able to provide excellent fade resistance when used in a friction material. If the above cumulative pore volume is too large, bonded portions between crystal grains of the titanate compound become weak and may not be able to hold the porous structure. The above cumulative pore volume can be measured by mercury porosimetry.

Furthermore, the BET specific surface area of the porous titanate compound particles according to the present invention is preferably within a range of 1 to 13 $m^2/g$ and more preferably within a range of 3 to 9 $m^2/g$. If the above BET specific surface area is too small, the porous titanate compound particles may not be able to provide excellent fade resistance when used in a friction material. If the above BET specific surface area is too large, the chemical reaction in the firing step may not have been completed.

The particle shape of the porous titanate compound particles according to the present invention is preferably a powdered shape, such as a spherical or irregular shape, and preferably a non-fibrous shape. Particularly, a spherical shape is preferred.

Although there is no particular limitation as to the particle size of the porous titanate compound particles according to the present invention, the average particle diameter of them is preferably 5 to 500 μm and more preferably 10 to 300 μm in view of their dispersibility into a friction material composition. The term average particle diameter used in the present invention means the particle diameter at 50% cumulative volume in a particle size distribution as determined by the laser diffraction and scattering method in which ultrasonic dispersion is not performed. These various types of particle shapes and particle sizes can be arbitrarily controlled depending on production conditions, particularly the composition of source materials, firing conditions, grinding process conditions, and so on.

Examples of the titanate compound that can be cited include those expressed by the composition formulae: $A_2Ti_nO_{(2n+1)}$ where A represents at least one selected from alkali metals and n=2 to 8; $M_xA_yTi_{(2-y)}O_4$ where M represents any alkali metal other than lithium, A represents at least one selected from lithium, magnesium, zinc, nickel, copper, iron, aluminum, gallium, and manganese, x=0.5 to 1.0, and y=0.25 to 1.0; $K_{0.5-0.8}Li_{0.27}Ti_{1.73}O_{3.85-4}$; $K_{0.2-0.8}Mg_{0.4}Ti_{1.6}O_{3.7-4}$; and so on.

Among the above titanate compounds, a titanate compound expressed by the composition formula $A_2Ti_nO_{(2n+1)}$ where A represents at least one selected from alkali metals and n=2 to 8 is preferred and a titanate compound expressed by the composition formula $A_2Ti_6O_{13}$ where A represents at least one selected from alkali metals is more preferred. Examples of the alkali metals include lithium, sodium, potassium, rubidium, cesium, and francium and those preferred among them are lithium, sodium, and potassium because they have an economic advantage over the others. More specifically, $Li_2Ti_6O_{13}$, $K_2Ti_6O_{13}$, $Na_2Ti_6O_{13}$, and so on can be cited as examples.

Although there is no particular limitation as to the method for producing the porous titanate compound particles according to the present invention so long as it can provide the properties described previously, an example of the method that can be cited is a method for producing porous titanate compound particles by dry-granulating a ground mixture obtained by mechanically grinding a titanium source and an alkali metal salt, firing the granulated mixture, and surface-treating the resultant fired product (porous titanate compound particles) with a hydrophobic surface treatment agent.

An example of the mechanical grinding that can be cited is the method of grinding the materials while making a physical impact on them. A specific example that can be cited is grinding with a vibration mill. It can be considered that when grinding processing with a vibration mill is performed, shear stress produced due to frictional grinding of the powder mix concurrently causes a disorder of the atomic arrangement and a decrease in interatomic distance, so that atom transfer occurs at contact points between heterogeneous particles, resulting in the formation of a metastable phase. Thus, a ground mixture having a high reaction activity is obtained, so that the firing temperature to be described hereinafter can be lowered and an unreacted product can be reduced even if the ground mixture is granulated. In order to efficiently apply shear stress to the source materials, the mechanical grinding is preferably performed as dry processing in which neither water nor solvent is used.

There is no particular limitation as to the processing time for the mechanical grinding, but it is generally preferably within a range of 0.1 to 2 hours.

The granulation of the ground mixture is performed by dry granulation in which neither water nor solvent is used. The dry granulation can be performed by known methods and examples include tumbling granulation, fluidized bed granulation, and agitation granulation. Wet granulation is not preferred because vaporization of a liquid substance inside a granulated material during the process of drying the granulated material results in the provision of porous particles having large cavities thereinside and the powder strength is thus decreased. In addition, the application of heat to the granulated material is necessary for vaporization of water and solvent, resulting in poor mass productivity.

The temperature for firing the granulated material can be appropriately selected according to the composition of a desired titanate compound, but it is preferably within a range of 650 to 1000° C. and more preferably within a range of 800 to 950° C. The firing time is preferably 0.5 to 8 hours and more preferably 2 to 6 hours.

There is no particular limitation as to the titanium source so long as it is a source material containing elemental titanium and not inhibiting the production of an oxide by firing, and examples include compounds that can be converted to titanium oxide by firing in air. Examples of such compounds include titanium oxide, rutile ores, wet cake of titanium hydroxide, and aqueous titania, but the preferred is titanium oxide.

Examples of the alkali metal salt include alkali metal carbonates; alkali metal hydrogen carbonates; alkali metal hydroxides; alkali metal organic acid salts, such as alkali metal acetates; alkali metal sulfates; and alkali metal nitrates, but the preferred are alkali metal carbonates.

The mixture ratio between the titanium source and the alkali metal salt can be appropriately selected according to the composition of the desired titanate compound.

Examples of the hydrophobic surface treatment agent for use in the present invention include hydrophobic silane coupling agents, titanate-based coupling agents, and aluminate-based coupling agents. Among them, hydrophobic silane coupling agents are preferably used.

A hydrophobic silane coupling agent is a silane coupling agent having an essentially hydrophobic functional group, such as an alkyl group or an aryl group, and a hydrolyzable functional group capable of producing a group reactable with a hydrophilic group present on the surfaces of the titanate compound particles. Typical examples of such a hydrophobic silane coupling agent include alkoxysilanes represented by the following general formula (1):

$$R^1_n Si(OR^2)_{4-n} \qquad (1)$$

where in the general formula (1) n represents an arbitrary integer selected from 1 to 3; $R^1$ represents an alkyl group, an alkenyl group or an aryl group, each group having a substituent or being free of substituent; as for $R^1$ comprising a plurality of $R^1$s, the plurality of $R^1$s may be identical to or different from each other; $R^2$ is an alkyl group having a substituent or free of substituent; and as for $R^2$ comprising a plurality of $R^2$s, the plurality of $R^2$s may be identical to or different from each other.

Examples of the alkyl group represented by $R^1$ include alkyl groups having 1 to 20 carbon atoms, such as a methyl group, an ethyl group, a propyl group, a butyl group, a pentyl group, a hexyl group, an octyl group, a decyl group, a dodecyl group, a hexadecyl group, and an octadecyl group. Among them, the preferred are alkyl groups having 8 to 20 carbon atoms. The above alkyl groups may have a cyclic structure or a branched structure and, generally, alkyl groups having a larger number of straight-chain carbon atoms tend to have higher hydrophobicity. The alkyl group may have, at arbitrary sites, one to four substituents to be described hereinafter (preferably one to three substituents and more preferably a single substituent).

Examples of the alkenyl group represented by $R^1$ include a vinyl group and a butenyl group and these groups may have a cyclic structure or a branched structure. The alkenyl group may have, at arbitrary sites, one to four substituents to be described hereinafter (preferably one to three substituents and more preferably a single substituent).

Examples of the aryl group represented by $R^1$ include a phenyl group and a naphthyl group. The aryl group may have, at arbitrary sites, one to four substituents to be described hereinafter (preferably one to three substituents and more preferably a single substituent).

The above groups represented by $R^1$ may each have a substituent so long as their hydrophobicity is not inhibited. Examples of the substituent that can be cited include hydrophobic substituents, such as a fluorine atom and a (meth)acryloxy group.

Furthermore, the above alkyl group may have, as a hydrophobic substituent, such as an aryl group as exemplified above and the above aryl group may have an alkyl group as a hydrophobic substituent. Note that, generally, for the purpose of improving the adhesion between titanate compound particles and a thermosetting resin, the titanate compound particles may be surface treated with a silane coupling agent having an amino group in order to use the reactivity of the amino group with the resin. However, this method is not preferred in the present invention because the amino group inhibits the hydrophobicity of the silane coupling agent.

Examples of the alkyl group represented by $R^2$ include those exemplified for $R^1$ as described above. However, because the alkoxy group ($OR^2$) in the above alkoxysilane is a hydrolyzable group, the preferred $R^2$s are lower alkyl groups having 4 or less carbon atoms in view of hydrolyzability. Among them, a methyl group and an ethyl group are most preferably used.

The index n represents an arbitrary integer selected from 1 to 3 and is preferably 1 from the viewpoint of reactivity with the surfaces of the titanate compound particles and hydrophobicity.

Specific examples of the above alkoxysilane that can be cited include methyltrimethoxysilane, ethyltrimethoxysilane, hexyltrimethoxysilane, decyltrimethoxysilane, phenyltrimethoxysilane, methyltriethoxysilane, ethyltriethoxysilane, hexyltriethoxysilane, decyltriethoxysilane, and phenyltriethoxysilane and these alkoxysilanes can be used singly or in combination of two or more thereof.

The degree of hydrophobicity of the surface treatment agent in the present invention can be indicated by treating the surface of a glass plate with the surface treatment agent and measuring the surface free energy of the treated surface. The surface free energy of the hydrophobic surface treatment agent for use in the present invention is preferably 50 mN/m or less, more preferably 5 to 50 mN/m, and still more preferably 10 to 30 mN/m. The surface free energy in the present invention can be determined by uniformly applying a surface treatment agent diluted 10-folds with methanol to a glass plate, heating the glass plate at 85° C. for an hour, then subjecting it to a heat treatment at 110° C. for an hour, and calculating the surface free energy of the surface to which the surface treatment agent is applied by measuring the static contact angles of two liquids, water and decane, on the surface. For example, the surface free energy of decyltrimethoxysilane is 28 mN/m and the surface free energy of 3-aminopropyltriethoxysilane is 68 mN/m.

Known methods can be used as a method for treating the surfaces of porous titanate compound particles with a surface treatment agent. For example, the treatment is implemented by dissolving a surface treatment agent in a solvent for accelerating hydrolysis (for example, water, alcohol or a mixed solvent of them) to prepare a solution, spraying the solution on the porous titanate compound particles, and then drying the porous titanate compound particles. The concentration of the surface treatment is preferably 0.1 to 3.0% by mass, more preferably 0.2 to 2.0% by mass, and still more preferably 0.3 to 1.0% by mass relative to 100% by mass porous titanate compound particles.

Since the porous titanate compound particles according to the present invention have a small pore diameter as described previously, this can reduce impregnation of porous particles with a thermosetting resin. Therefore, in a friction material obtained by forming a friction material composition containing the porous titanate compound particles according to the present invention, the porous particles serve as escape holes for fading gas. Hence, it can be considered that even if the forming pressure is not adjusted at a smaller value in the step of binding and forming a source material mixture, excellent fade resistance can be achieved. The porous titanate compound particles according to the present invention not only improve the fade resistance but also are expected as a friction modifier containing no WHO fiber since they are non-fibrous porous bodies.

Furthermore, since the porous titanate compound particles according to the present invention are surface treated with a hydrophobic surface treatment agent as described above, moisture absorption into the porous particles can be reduced, thus increasing the moisture-proof properties of the porous titanate compound particles. In addition, a friction material obtained by forming a friction material composition containing the porous titanate compound particles according to the present invention can be increased in moisture-proof properties although the reason for this is not clear. Therefore, brake noise (squeal) produced during braking can be expected to be reduced.

The porous titanate compound particles after being surface treated are comparable in the cumulative pore volume within a pore diameter range of 0.01 to 1.0 μm, the maximum value of the pore size distribution, and the BET specific surface area with the porous titanate compound particles before being surface treated.

<Friction Material Composition>

A friction material composition according to the present invention contains the above porous titanate compound particles and a thermosetting resin. The friction material composition according to the present invention may further contain other materials as necessary. A description will be given below of each of the components of the friction material composition according to the present invention.

(Porous Titanate Compound Particles)

The porous titanate compound particles that can be used are arbitrary porous titanate compound particles appropriately selected from among those described above.

The content of the porous titanate compound particles in the friction material composition is preferably 3 to 30% by mass relative to 100% by mass which is the total amount of the friction material composition. When the content of the porous titanate compound particles is within a range of 3 to 30% by mass, excellent frictional properties can be achieved.

(Thermosetting Resin)

The thermosetting resin is used as a binder for binding the porous titanate compound particles and so on together to give strength, and the thermosetting resin that can be used is an arbitrary one appropriately selected from among known thermosetting resins for use as a binder. Examples that can be cited include: phenolic resins; elastomer-dispersed phenolic resins, such as acrylic elastomer-dispersed phenolic resins and silicone elastomer-dispersed phenolic resins; modified phenolic resins, such as acrylic-modified phenolic resins and silicone-modified phenolic resins; formaldehyde resins; melamine resins; epoxy resins; acrylic resins; aromatic polyester resins; and urea resins and these resins can be used singly or in combination of two or more thereof. Preferred among them are phenolic resins and modified phenolic resins in view of thermal resistance, formability, and frictional properties.

The content of the thermosetting resin in the friction material composition is preferably 3 to 20% by mass relative to 100% by mass which is the total amount of the friction material composition. When the content of the thermosetting resin is within a range of 3 to 20% by mass, spaces between compounding materials are filled with a suitable amount of binder, so that excellent frictional properties can be achieved.

(Other Materials)

The friction material composition according to the present invention may contain, as necessary, materials other than the above-mentioned materials, i.e., the porous titanate compound particles and the thermosetting resin. Examples of the other materials that can be cited include a fibrous base material and a friction modifier as will be described below.

Examples of the fibrous base material include: organic fibers, such as aromatic polyamide (aramid) fibers, acrylic fibers, cellulose fibers, and phenolic resin fibers; metal fibers, such as steel fibers, copper fibers, alumina fibers, and zinc fibers; inorganic fibers, such as glass fibers, rock wool, ceramic fibers, biodegradable fibers, biosoluble fibers, and wollastonite fibers; and carbon fibers. These various kinds of fibers can be used singly or in combination of two or more thereof.

Examples of the friction modifier include: organic fillers, such as various kinds of rubber powders (e.g., raw rubber powder and tire powder), cashew dust, and melamine dust; inorganic powders, such as barium sulfate, calcium carbonate, lithium carbonate, calcium hydroxide, vermiculite, clay, mica, and talc; metal powders, such as copper, bronze, aluminum, zinc, iron, and tin; inorganic fillers, such as titanate compound powders other than the porous titanate compound particles according to the present invention, i.e., those having a different particle shape, such as spherical, laminar, platy, prismoidal, blocky or irregular shape; abrasive materials, such as silicon carbide, titanium oxide, alumina (aluminum oxide), silica (silicon dioxide), magnesia (magnesium oxide), zirconia (zirconium oxide), zirconium silicate, chromium oxide, iron oxide, chromite, and quartz; and solid lubricants, such as synthetic or natural graphite, phosphate-coated graphite, carbon black, coke, antimony trisulfide, molybdenum disulfide, tin sulfide, and polytetrafluoroethylene (PTEF). These friction modifiers can be used singly or in combination of two or more thereof.

The content of the other materials in the friction material composition is preferably 60 to 94% by mass relative to 100% by mass which is the total amount of the friction material composition.

(Method for Producing Friction Material Composition)

The friction material composition according to the present invention can be produced by, for example, (1) a method of mixing components with a mixer (such as a Lodige mixer, a pressure kneader or an Eirich mixer) or (2) a method of preparing a granulated material of desired components and, if necessary, mixing it together with other components using a mixer (such as a Lodige mixer, a pressure kneader or an Eirich mixer).

The content of each component in the friction material composition according to the present invention can be appropriately selected according to the desired frictional properties and flexibility.

Alternatively, the friction material composition according to the present invention may be prepared by producing a master batch containing a particular component at a high concentration, adding a thermosetting resin and so on to the master batch, and mixing them.

<Friction Material and Friction Member>

A friction material according to the present invention can be produced into a predetermined shape by preliminarily forming the friction material composition according to the present invention at ordinary temperature, forming the resultant preform by the application of heat and pressure (at a forming pressure of 10 to 40 MPa and a forming temperature of 150 to 200° C.), subjecting, if necessary, the resultant formed body to heat treatment (holding it at 150 to 220° C. for 1 to 12 hours) in a furnace, and then subjecting the formed body to machining and polishing processes.

The friction material according to the present invention is used as a friction member formed so that the friction material forms a friction surface. Examples of the friction member formable using a friction material include: (1) a structure composed of the friction material only; and (2) a structure including a substrate, such as a back metal, and a friction material provided on the substrate and having a friction surface formed by the friction material composition according to the present invention.

The substrate is used in order to increase the mechanical strength of the friction member, wherein metal, fiber-reinforced resin or other materials can be used as the material for the substrate. Examples of the material that can be cited include iron, stainless steel, glass fiber-reinforced resin, and carbon fiber-reinforced resin.

The friction material according to the present invention can be used for friction members, such as brake pads, brake linings, and clutch facing in various vehicles and industrial machines. Furthermore, the friction material according to the present invention can achieve excellent frictional properties without containing copper, such as copper powder or copper fibers, from the viewpoint of consideration for natural environment.

EXAMPLES

The present invention will be described below in further detail with reference to specific examples. The present invention is not at all limited by the following examples and modifications and variations may be appropriately made therein without changing the gist of the invention.

<Production of Titanate Compound Particles>

Example 1

Titanium oxide and potassium carbonate weighed to give Ti:K=3:1 (molar ratio) were mixed for 10 minutes while being ground with a vibration mill. The obtained ground mixture was dry granulated with a high-speed mixer and then fired at 850° C. for four hours in an electric furnace, thus obtaining powder.

The obtained powder was confirmed to be single-phase $K_2Ti_6O_{13}$ using an X-ray diffraction measurement device (Ultima IV manufactured by Rigaku Corporation). The average particle diameter was 169 μm, which was derived from a laser diffraction particle size distribution measurement device (SALD-2100 manufactured by Shimadzu Corporation).

The shape of the obtained powder was observed using a field-emission scanning electron microscope (SEM) (S-4800 manufactured by Hitachi High-Technologies Corporation), and it was confirmed that the obtained powder was spherical particles having fine voids of less than 1 μm between particulates. FIG. 1 shows a SEM photograph of complete images of particles and FIG. 2 shows a SEM photograph of the internal structure of a particle.

The pores in the obtained porous titanate compound particles were measured using a mercury porosimeter (Pore-Master 60-GT manufactured by Quantachrome Instruments). The cumulative pore volume within a pore diameter range of 0.01 to 1.0 μm was 21.1% and the maximum value of the pore size distribution was 0.11 μm.

Furthermore, the obtained porous titanate compound particles was measured in terms of BET specific surface area, resulting in a BET specific surface area of 5.9 $m^2/g$.

The obtained porous titanate compound particles were subjected to a surface treatment using a methanol solution of decyltrimethoxysilane, thus obtaining porous titanate compound particles of this example. The surface treatment was conducted so that the amount of decyltrimethoxysilane was 0.5% by mass relative to 100% by mass porous titanate compound particles.

Comparative Example 1

Untreated porous titanate compound particles before being surface treated with decyltrimethoxysilane were used as porous titanate compound particles of Comparative Example 1.

Comparative Example 2

The porous titanate compound particles obtained in Example 1 were subjected to a surface treatment using a methanol solution of 3-aminopropyltriethoxysilane, thus obtaining porous titanate compound particles of Comparative Example 2. The surface treatment was conducted so that the amount of 3-aminopropyltriethoxysilane was 0.5% by mass relative to 100% by mass titanate compound particles.

Comparative Example 3

Titanium oxide, potassium carbonate, and lithium carbonate weighed to give Ti:K:Li=1.73:0.8:0.27 (molar ratio) were mixed in the usual manner and the source material mixture was mixed for 30 minutes while being ground with a vibration mill. The obtained ground mixture was fired at 1000° C. for four hours in an electric furnace and the fired product was ground, thus obtaining powder. The obtained powder was dispersed into water to prepare a 10% by mass slurry and sulfuric acid was added to the slurry to control the pH to 9. The solid content of this slurry was collected by filtration and dried. After being dried, the product was fired at 600° C. for an hour in an electric furnace, thus obtaining powder.

The obtained powder was confirmed to be lithium potassium titanate ($K_{0.7}Li_{0.27}Ti_{1.73}O_{3.95}$) having lepidocrocite-type layered crystals using an X-ray diffraction measurement device. The average particle diameter was 15 μm, which was derived from a laser diffraction particle size distribution measurement device. The powder shape was confirmed to be platy particles using a SEM.

Comparative Example 4

The platy titanate compound particles obtained in Comparative Example 3 were subjected to a surface treatment using a methanol solution of decyltrimethoxysilane, thus obtaining powder. The surface treatment was conducted so that the amount of decyltrimethoxysilane was 0.5% by mass relative to 100% by mass titanate compound particles.

Comparative Example 5

Hollow titanate compound particles disclosed in Patent Literature 4 above were produced in the following manner.

Titanium oxide and potassium carbonate weighed to give Ti:K=3:1 (molar ratio) were mixed for 10 minutes while being ground with a vibration mill. The obtained ground mixture was fired at 1050° C. for four hours in an electric furnace and the fired product was ground with a grinding mill, thus obtaining prismoidal powder having an average breadth of 1.9 μm, an average length of 3.1 μm, and an average aspect ratio of 1.7.

A slurry was prepared using the obtained prismoidal powder, an ethylcellulose-based binder, and a polycarboxylic acid ammonium salt and the obtained slurry was spray dried. Next, the powder obtained by the spray drying was subjected to a heat treatment at 900° C. for two hours.

The evaluation of the obtained powder was made in the same manner as in Example 1. As a result, it was confirmed that the powder was single-phase $K_2Ti_6O_{13}$ and spherical particles having an average particle diameter of 141 μm, a cumulative pore volume of 2.8% within a pore diameter range of 0.01 to 1.0 μm, and a maximum value of the pore size distribution of 1.9 μm. The obtained powder was observed with a SEM and thus confirmed to be hollow spherical particles having many voids of 1 to 5 μm.

Furthermore, the obtained powder was measured in terms of BET specific surface area, resulting in a BET specific surface area of 0.6 m²/g.

Comparative Example 6

The powder obtained in Comparative Example 5 was ground in a mortar, thus obtaining prismoidal powder.

<Production of Friction Material>

Source materials were compounded at each compounding ratio shown in Table 1 and mixed with a Lodige mixer, thus obtaining a friction material composition. The obtained friction material composition was preliminarily formed (at 25 MPa), hot formed (at 150° C. and 20 MPa), and further subjected to a heat treatment (at 220° C.). The obtained formed body was processed into a sector form having an area of 5.5 cm², thus obtaining a friction material.

<Evaluation of Friction Material>

A friction test (fade test) for each friction material was done using a general-purpose, full-sized dynamometer tester in conformity with JASO C-406.

The porosity of each friction material was measured by oil immersion in conformity with JIS D4418. The results are shown in Table 1.

The water absorbency of each friction material was determined by adding 20 μL of water dropwise directly to the surface of the friction material in an environmental chamber at 20° C. and 50% RH and measuring the time for water absorption.

The percentage of water absorption of each friction material was determined by immersing the friction material into water for 10 minutes and making a calculation from the masses of the friction material before and after the immersion based on the following formula:

Percentage of water absorption [%]={((mass of friction material after immersion) [g]−(mass of friction material before immersion) [g])/(mass of friction material before immersion) [g]}×100

Note that, as for Comparative Examples 11 and 12, because their results of the friction test were poor, their water absorbency and percentage of water absorption were not evaluated.

TABLE 1

| | | Ex. 2 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|
| Compounding [% by mass] | Ex. 1 (porous $K_2Ti_6O_{13}$, hydrophobic surface treatment) | 20 | | | | | | |
| | Comp. Ex. 1 (porous $K_2Ti_6O_{13}$) | | 20 | | | | | |
| | Comp. Ex. 2 (porous $K_2Ti_6O_{13}$, non-hydrophobic surface treatment) | | | 20 | | | | |
| | Comp. Ex. 3 (platy $K_{0.7}Li_{0.27}Ti_{1.73}O_{3.95}$) | | | | 20 | | | |
| | Comp. Ex. 4 (platy $K_{0.7}Li_{0.27}Ti_{1.73}O_{3.95}$, hydrophobic surface treatment) | | | | | 20 | | |
| | Comp. Ex. 5 (hollow $K_2Ti_6O_{13}$) | | | | | | 20 | |
| | Comp. Ex. 6 (prismoidal $K_2Ti_6O_{13}$) | | | | | | | 20 |
| | Phenolic resin | 10 | 10 | 10 | 10 | 10 | 10 | 10 |

TABLE 1-continued

| | | Ex. 2 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|
| | Barium sulfate | 20 | 20 | 20 | 20 | 20 | 20 | 20 |
| | Mica | 15 | 15 | 15 | 15 | 15 | 15 | 15 |
| | Cashew dust | 10 | 10 | 10 | 10 | 10 | 10 | 10 |
| | Iron oxide | 10 | 10 | 10 | 10 | 10 | 10 | 10 |
| | Zirconium oxide | 5 | 5 | 5 | 5 | 5 | 5 | 5 |
| | Tin sulfide | 5 | 5 | 5 | 5 | 5 | 5 | 5 |
| | Synthetic graphite | 2 | 2 | 2 | 2 | 2 | 2 | 2 |
| | Aramid pulp | 2 | 2 | 2 | 2 | 2 | 2 | 2 |
| | Lime hydrate | 1 | 1 | 1 | 1 | 1 | 1 | 1 |
| Properties | Friction test (first fade test, minimum μ per 10 braking actions) | 0.34 | 0.31 | 0.30 | 0.22 | 0.25 | 0.15 | 0.11 |
| | Porosity [%] | 25.3 | 23.5 | 26.1 | 19.4 | 19.4 | 23.1 | 18.0 |
| | Water absorbency [min] | 28.3 | 1.3 | 0.3 | 16.5 | 17.3 | | |
| | Percentage of water absorption [%] | 2.1 | 4.6 | 4.6 | 2.3 | 2.0 | | |

It can be seen that, as shown in Table 1, in Example 2 in which the porous titanate compound particles of Example 1 according to the present invention are used, the minimum coefficient of friction (μ) per 10 braking actions, which is one of fade test items, is higher than in Comparative Examples 7 to 12 in which the titanate compound particles of Comparative Examples 1 to 6 are used, they take a long time to absorb water, and, therefore, Example 2 exhibits excellent fade resistance and moisture-proof properties.

The invention claimed is:

1. Porous titanate compound particles having a cumulative pore volume of 5% or more within a pore diameter range of 0.01 to 1.0 μm, each formed of titanate compound crystal grains bonded together, and each of the porous titanate compound particles including a treated layer formed on a surface thereof and made of a hydrophobic surface treatment agent.

2. The porous titanate compound particles according to claim 1, wherein the hydrophobic surface treatment agent is alkoxysilane represented by the following general formula (1):

$$R^1{}_n Si(OR^2)_{4-n} \quad (1)$$

where in the general formula (1) n represents an arbitrary integer selected from 1 to 3; $R^1$ represents an alkyl group, an alkenyl group or an aryl group, each group having a substituent or being free of substituent; as for $R^1$ comprising a plurality of $R^1$s, the plurality of $R^1$s are identical to or different from each other; $R^2$ is an alkyl group having a substituent or free of substituent; and as for $R^2$ comprising a plurality of $R^2$s, the plurality of $R^2$s are identical to or different from each other.

3. The porous titanate compound particles according to claim 1, having an average particle diameter of 5 to 500 μm.

4. The porous titanate compound particles according to claim 1, wherein the titanate compound is expressed by a composition formula $A_2Ti_nO_{(2n+1)}$ where A represents at least one selected from alkali metals and n=2 to 8.

5. A friction material composition containing: the porous titanate compound particles according to claim 1; and a thermosetting resin.

6. A friction material obtained by forming the friction material composition according to claim 5.

7. A friction member comprising a substrate and the friction material according to claim 6, the friction material being provided on the substrate.

8. A method for producing the porous titanate compound particles according to claim 1, the method comprising the steps of:
mechanically grinding a titanium source and an alkali metal salt to prepare a ground mixture;
dry-granulating the ground mixture to prepare a granulated material;
firing the granulated material to produce a fired product; and
surface-treating the fired product with a hydrophobic surface treatment agent.

* * * * *